(12) United States Patent
Kastner et al.

(10) Patent No.: US 10,069,330 B2
(45) Date of Patent: Sep. 4, 2018

(54) UNIT HAVING A SWITCHING FUNCTION FOR ETHERNET

(71) Applicant: KNORR-BREMSE SYSTEME FÜR SCHIENENFAHRZEUGE GMBH, Munich (DE)

(72) Inventors: Karl Kastner, Munich (DE); Achim Braun, Planegg (DE); Ralf Furtwängler, Munich (DE); Oliver Riediger, Munich (DE)

(73) Assignee: KNORR-BREMSE SYSTEME FÜR SCHIENENFAHRZEUGE GMBH, Munich (DE)

( * ) Notice: Subject to any disclaimer, the term of this patent is extended or adjusted under 35 U.S.C. 154(b) by 590 days.

(21) Appl. No.: 14/355,086

(22) PCT Filed: Oct. 30, 2012

(86) PCT No.: PCT/EP2012/071445
§ 371 (c)(1),
(2) Date: Apr. 29, 2014

(87) PCT Pub. No.: WO2013/064480
PCT Pub. Date: May 10, 2013

(65) Prior Publication Data
US 2014/0312698 A1    Oct. 23, 2014

(30) Foreign Application Priority Data
Nov. 3, 2011   (DE) .................. 10 2011 117 589

(51) Int. Cl.
*H02J 9/06* (2006.01)
*H04L 12/10* (2006.01)
(Continued)

(52) U.S. Cl.
CPC .............. *H02J 9/061* (2013.01); *H04L 12/10* (2013.01); *H04L 12/40045* (2013.01);
(Continued)

(58) Field of Classification Search
CPC .... H02J 9/061; H04L 12/40045; H04L 12/10; H04L 12/40189; H04L 2012/40293; H04L 12/437; Y10T 307/62
See application file for complete search history.

(56) References Cited

U.S. PATENT DOCUMENTS 7,441,133 B2 * 10/2008 Giat ..................... H04L 12/10
713/300
7,724,650 B2 *  5/2010 Karam ................... H04L 1/22
340/425.2
(Continued)

FOREIGN PATENT DOCUMENTS

DE         10242921 A1    3/2004
DE       102006036770 A1   2/2008
(Continued)

OTHER PUBLICATIONS

Transmittal of International Preliminary Report on Patentability for International Application No. PCT/EP2012/071445, dated Oct. 30, 2012 and Written Opinion.
(Continued)

*Primary Examiner* — Jared Fureman
*Assistant Examiner* — Emmanuel R Dominique
(74) *Attorney, Agent, or Firm* — Barnes & Thornburg LLP

(57) ABSTRACT

An arrangement for a switching function unit for Ethernet having a number of active components of the Ethernet which are combined by a switching function unit to form a functional unit; and at least three mutually independent power supplies for supplying power to the active components,
(Continued)

wherein a first of the at least three power supplies is a local power supply for the switching function unit, a second of the at least three power supplies is a first extraneous power supply via Ethernet for the switching function unit, and a third of the at least three power supplies is a second extraneous power supply via Ethernet for the switching function unit.

14 Claims, 4 Drawing Sheets

(51) Int. Cl.
*H04L 12/40* (2006.01)
*H04L 12/437* (2006.01)
(52) U.S. Cl.
CPC ...... *H04L 12/40189* (2013.01); *H04L 12/437* (2013.01); *H04L 2012/40293* (2013.01); *Y10T 307/62* (2015.04)

(56) References Cited

U.S. PATENT DOCUMENTS

| | | | |
|---|---|---|---|
| 7,808,249 B1* | 10/2010 | Lo | H04L 43/50 324/534 |
| 2004/0157487 A1* | 8/2004 | Laity | H01R 13/72 439/501 |
| 2005/0190754 A1* | 9/2005 | Golikeri | H04L 29/12009 370/383 |
| 2006/0077891 A1* | 4/2006 | Smith | H04L 1/22 370/220 |
| 2006/0117089 A1* | 6/2006 | Karam | H04L 1/22 709/208 |
| 2008/0100141 A1 | 5/2008 | Lee et al. | |
| 2009/0003373 A1 | 1/2009 | Morrissey et al. | |
| 2009/0031152 A1* | 1/2009 | Bolderl-Ermel | G06F 1/266 713/300 |
| 2009/0152943 A1 | 6/2009 | Diab et al. | |
| 2009/0228722 A1 | 9/2009 | Lin | |
| 2010/0014858 A1* | 1/2010 | Barbarossa | H04L 49/557 398/45 |
| 2010/0231054 A1 | 9/2010 | Togawa | |
| 2011/0026411 A1 | 2/2011 | Hao | |
| 2011/0234002 A1* | 9/2011 | Hiscock | H04L 12/10 307/32 |
| 2011/0264795 A1* | 10/2011 | Koide | H04L 43/0805 709/224 |
| 2012/0318930 A1* | 12/2012 | Beyer | B61L 15/0036 246/167 R |

FOREIGN PATENT DOCUMENTS

| | | |
|---|---|---|
| JP | S5717680 A | 10/1982 |
| JP | 2007088809 A | 4/2007 |
| JP | 2008538486 A | 10/2008 |
| JP | 2010213068 A | 9/2010 |
| WO | 2006051355 A1 | 5/2006 |
| WO | 2006113858 A2 | 10/2006 |
| WO | 2010072701 A1 | 7/2010 |

OTHER PUBLICATIONS

English Translation of the International Preliminary Report on Patentability for International Application No. PCT/EP2012/071445, dated Oct. 30, 2012 and Written Opinion.
Search Report for German Patent Application No. 10 2011 117 589.3; dated Jul. 2, 2012.
Search Report for International Patent Application No. PCT/EP2012/071445; dated Feb. 28, 2013.
Japanese Office Action corresponding Japanese Patent Application 2014-540393, dated Nov. 21, 2016.

* cited by examiner

UNIT HAVING A SWITCHING FUNCTION FOR ETHERNET

PRIORITY CLAIM

This patent application is a U.S. National Phase of International Patent Application No. PCT/EP2012/071445, filed 30 Oct. 2012, which claims priority to German Patent Application No. 10 2011 117 589.3, filed 3 Nov. 2011, the disclosures of which are incorporated herein by reference in their entirety.

FIELD

Disclosed embodiments relate to a unit with a switching function for Ethernet, and relates in particular to a unit containing a plurality of active components with a switching function for an Ethernet-based and highly available network with a long spatial extension.

BACKGROUND

An industrial Ethernet, which is also referred to as a real-time Ethernet, is a generic term for attempts to make the Ethernet standard usable for the networking of devices which are used in the industrial environment, e.g. in industrial production.

In an environment of this type, a multiplicity of devices communicating and exchanging data with one another are generally to be networked with one another. In particular, control devices, to which terminal devices or communication participants are in turn connectable, must normally be interconnected. Network devices with control functions (control device) are frequently interconnected in a ring topology for this purpose, and terminal devices or communication participants are in turn connected to a respective control device.

In the case of a ring topology, redundancy is already created from its fundamental mode of operation, according to which—expressed simply—a packet or frame or token moves along the ring and initially stops at every node of the ring. If a node wishes to transmit data, it adds a destination address of a destination node and data to the packet. The packet continues to circulate around the ring in search of the destination address. If it is found, the corresponding data are transferred out of the packet, and the circulation cycle continues as described.

In the event of a single interruption of the ring, for example due to a fault in the cabling, the packet can also pass through the ring in the opposite direction and thus still also reach all ring nodes. A double ring structure furthermore provides further protection for this purpose in that at least part of the double ring can be used as a bridge over an interrupted section of the single ring, or each of the rings of the double ring may reveal an interruption without the network being interrupted as a whole.

Substantial attention is focused in an interconnection of this type on the availability to be achieved with it. A rising degree of complexity with increasingly numerous components to be networked with one another also requires an increasingly high bandwidth and/or bit rate.

Manufacturers of control devices for spatially distributed installations or couplable vehicles, for example manufacturers of rail vehicles or systems for rail vehicles, with an increasing number of devices or control devices to be networked and/or increasingly long cable lengths, come up against limits of bus systems hitherto used, which manifest themselves, for example, in no longer adequate bandwidth for individual network participants and/or the aim to achieve a required high availability of the network.

BRIEF DESCRIPTION OF THE FIGURES

Disclosed embodiments are described in detail below with reference to the drawings, in which.

DETAILED DESCRIPTION OF THE DISCLOSED EMBODIMENTS

Figure 1:
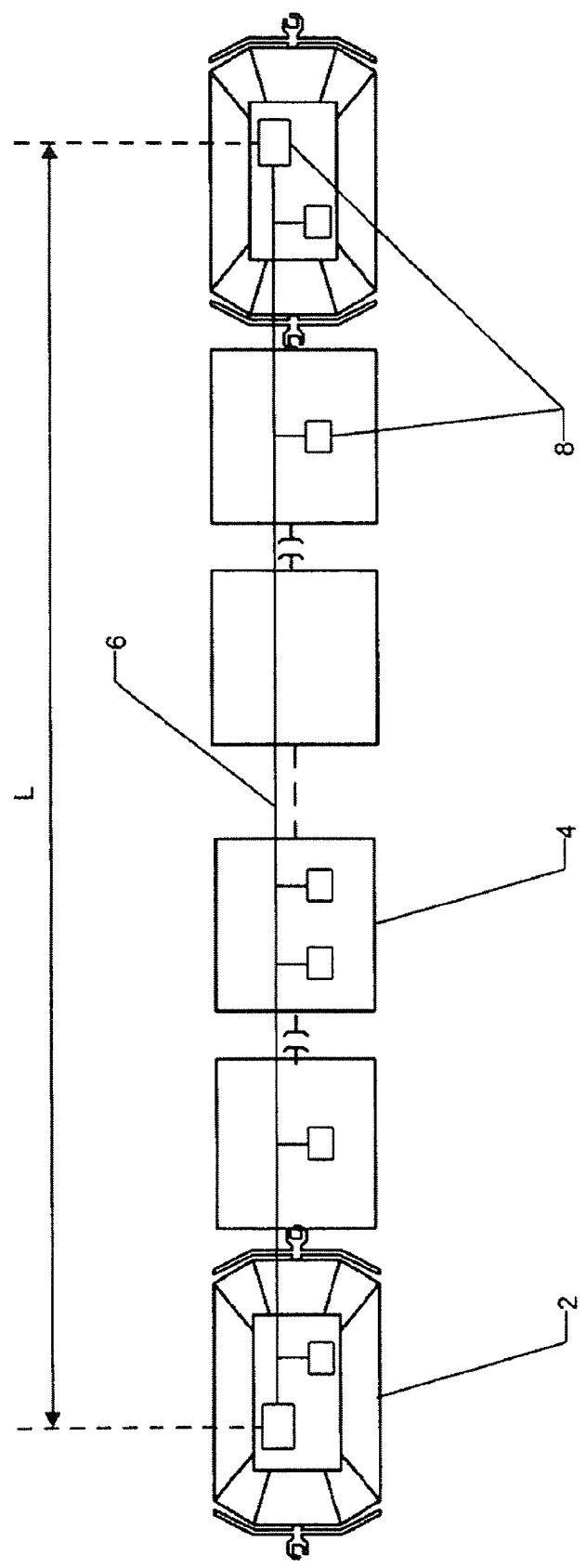
FIG. 1 shows a simplified representation of an example of a vehicle interconnection, for example a rail vehicle train, with a network structure with a cable length L.

Disclosed embodiments provide a unit at low cost with a switching function for a highly available Ethernet-based network with improved failsafe performance and a simultaneously high bandwidth in the case of a long extension of the network.

In addition, the disclosed embodiments are intended to be generally usable in distributed networks of industrial installations and also in combinations of coupled vehicles, such as, for example, an interconnection of rail vehicles.

Disclosed embodiments provide mutually supplied active components with a switching function in each case within the maximum permissible cable length of Ethernet network segments. A number of active components of this type are combined to form a functional unit with a switching function or switching function unit. Each such unit is supplied by three power sources independent from one another, wherein the three independent power sources in each case service the active components of the unit to the required extent. The three independent power sources are in each case a local power supply or dedicated power supply of the respective unit, a first one-way Power over Ethernet supply (from a first neighboring unit) via a signal line from a first direction of the Ethernet, a second one-way Power over Ethernet supply (from a second neighboring unit) via a signal line from a second direction of the Ethernet. In other words, a switching function unit, and therefore its active components also, in each case have a local power supply and can additionally be fed from two different directions, in each case one-way, and therefore via an overall mutual two-way supply via Power over Ethernet. Even if up to two power supplies of a switching function unit fail, their internal active components do not thereby go out of operation, and therefore a communication restriction does not yet exist on the Ethernet. The availability of the Ethernet is thus substantially improved and increased.

According to this general idea, the disclosed embodiments are usable in any given industrial Ethernet network with a large or long spatial extension in which high bandwidth and high availability are required.

Fundamental advantages of the disclosed embodiments exist in possible large spatial extension, simultaneously high bandwidth, low costs compared with known topologies, reduced cabling requirement due to the presentation of a redundant power supply via signal lines, and a minimum number of network components.

Disclosed embodiments provide a unit with a switching function or an arrangement for a switching function unit for Ethernet having a number of active components of the Ethernet which are combined by means of the switching function unit to form a functional unit; and at least three mutually independent power supplies for the power supply of the active components, wherein a first of the at least three power supplies is designed as a local power supply of the switching function unit, a second of the at least three power supplies is designed as a first external power supply via Ethernet of the switching function unit, and a third of the at least three power supplies is designed as a second external power supply via Ethernet of the switching function unit.

The switching function unit may have at least four Ethernet ports as connections, at least two of which can supply Power over Ethernet as the external power to outside the switching function unit, and at least two of which can receive Power over Ethernet as the external power from outside the switching function unit.

The switching function unit is thereby advantageously supplied with power in a normal operation of the local power supply and, in the event of a fault in the local power supply, is supplied with Power over Ethernet by at least one of the first and the second external power supplies.

As a result, if the local main or dedicated power supply of the switching function unit, which is effected, for example, via an overhead line, has a fault and cannot supply the power required for the operation of the Ethernet components and their communication, alternative power supplies are then advantageously available, their power enabling at least the communication on the Ethernet to be maintained even in the event of a fault.

The switching function unit can be supplied with Power over Ethernet via a first Ethernet line by a first active component of a first neighboring switching function unit; the switching function unit can be supplied with Power over Ethernet via a second Ethernet line by a second active component of a second neighboring switching function unit; and the power supply can be provided by the first and second active components of the neighboring first and second switching function units for all active components of the switching function unit.

The first and second external power supplies thus form, via Ethernet on the switching function unit, a mutual, two-way power supply of the switching function unit by means of Power over Ethernet via signal lines of the Ethernet.

As a result, a direction-independent, mutually two-way power supply is extremely advantageously provided via already existing Ethernet cabling for an entire switching function unit and the switching components combined therein and for the terminal devices supplied by the latter.

In the case of a cabling optionally routed in cable channels and as cable harnesses, at least some of the number of active components of the switching function unit may be accommodated in a common housing of the switching function unit.

As a result, the remaining advantages are achieved with a minimum outlay and material use and an optimum cost structure.

Under particular spatial conditions or, for example, for a retrofitting of existing cabling, networks, installations or systems, it may be advantageous if at least some of the number of active components of the switching function unit are arranged in a distributed manner in an environment of the switching function unit and are united by at least common power supply lines to the switching function unit. The individual components do not absolutely necessarily have to be accommodated in a single housing for the mode of operation of the proposed solution.

A particular advantage of the arrangement for a switching function unit is that at least one Ethernet terminal device can in each case be supplied with Power over Ethernet by means of the active components of the switching function unit, wherein the active components draw Power over Ethernet from the local power supply for the at least one terminal device in a normal operation and, in the event of a fault in the local power supply, draw Power over Ethernet via Ethernet from at least one of the first and second external power supplies for the at least one terminal device.

Thus, the power supply of a terminal device is directly safeguarded even in the event of a fault, and no further measures or outlay whatsoever then need to be provided for the terminal device.

A further particular advantage of the arrangement for a switching function unit is that each of the active components of the switching function unit has a power supply for Power over Ethernet independent from a respective other active component, the power supplies forming a mutual and two-way external power supply of the switching function unit outwards for neighboring switching function units; and, in the event of a fault in the local power supply of at least one neighboring switching function unit, the switching function unit supplies the at least one neighboring switching function unit by means of Power over Ethernet.

In other words, a switching function unit is advantageously simultaneously both a possible external power recipient (in the event of a fault at its own location) and also an external power provider (in the event of a fault elsewhere) in that the active components of the unit, at least those with a switching function, provide power from their own local power supply via Power over Ethernet if necessary to other switching units. The active components may be in each case active Ethernet switch components with a switching function.

Advantages arise in particular if the Ethernet has a line topology, an at least partially single ring topology or an at least partially double ring topology; and at least one Ethernet terminal device can be connected in a star topology to at least one of the active components which is designed as an active switch and/or can be supplied via the latter through Power over Ethernet.

Due to wide-ranging applicability and degrees of freedom in terms of the network topology and connection facilities, the proposed solution is advantageously usable not only in vehicle combinations of virtually any given length and any given number of units, but also in spatially widely distributed, permanently installed networks with high availability requirements.

For example, the arrangements for switching units can be designed in modular form and can be arranged, for example, strategically and/or at predetermined intervals in each case with their own local power supply for protection purposes, extension purposes and/or retrofitting purposes.

In such cases, a real-time Ethernet can advantageously be set up with a multiplicity of arrangements or modules for a switching function unit, wherein the switching function units are arranged successively in the Ethernet in such a way that a fault event in the local power supplies of at least two switching function units neighboring one another can be bridged by Power over Ethernet from switching function units in turn neighboring the latter, the local power supplies of which operate fault-free and interruption-free.

FIG. 1 shows a simplified example of an interconnection of rail vehicles, which is also referred to as a consist, in each case with a drive vehicle 2, for example a locomotive, on both ends, and a number of carriages or wagons 4 between the drive vehicles 2. A bus or network structure 6 runs through the entire coupled rail vehicle network with a cable length L with participants 8, for example at least one control device in at least one of the drive vehicles 2 and at least one other network participating, for example a further control device, a communication participant and/or a terminal device, in at least one of the carriages 4.

The bandwidth problems of current networking forms, which are normally based on a bus structure such as CAN, result, expressed in simplified terms, in a consideration of runtimes on the bus normally required in the event of a collision. A decision regarding a function or non-function, for example of a network section or network device can be made on an evaluation device, e.g. at a place with a master functionality or means for arbitration of collision resolution, only after the runtime has elapsed. If the bus becomes longer due to greater networking lengths, for example caused by a larger area to be supplied due to a greater number of network devices and/or due to an increasing cable or networking length, as may occur, for example, in a rail vehicle interconnection through coupling of individual carriages to form long trains, the available data rate or bit rate decreases due to the increasingly long runtimes. An increasing number of network participants which additionally generate data rate increases the reduction in the data rate available to a network participant.

According to FIG. 1, assuming a length of the carriages 4 of 25 m and, for example, 16 coupled vehicles, i.e. a train length of around 400 m, the cable length L of the bus or network structure including additional installation components, caused by e.g. suitable or required line feeds or safety factors, can readily attain 800 m through the entire rail vehicle interconnection.

Current bus systems and network technologies, such as, for example, CAN (Controller Area Network), Profibus, MVB (Multifunction Vehicle Bus) and the like can no longer guarantee the necessary bandwidth with such cable lengths and must therefore, where appropriate, be segmented and designed with an additional hierarchy to connect the segments. As a result, the necessary data rate can, where appropriate, be maintained. However, the availability of the network decreases undesirably due to the additional outlay and the associated higher probability of failure.

Ethernet-based networking, on the other hand, with its wide distribution and economical availability, is suitable from the point of view of the essentially possible data rate and furthermore offers an improved functionality and can moreover be implemented at low cost.

Real-time capability is attainable in an Ethernet of this type by means of a switched or industrial Ethernet. All network components have point-to-point connections to avoid collisions.

However, Ethernet is subject to a general limitation in each case to a cable length of 100 m as the maximum possible distance between components and is therefore only conditionally suitable as a bus system. Networks with cable lengths of more than 100 m must normally be set up by means of intermediate electronic switchover devices to connect a plurality of network participants or network segments in a local network, referred to as switches or switching hubs, with active (switching or switchover) components with a switching function. However, as a disadvantage of Ethernet compared with conventional bus systems without active components, the failure of one active component interrupts the communication connection. Active components such as switches and the like and their essential mode of operation are adequately known, so that they will not be discussed further at this point.

Figure 2:
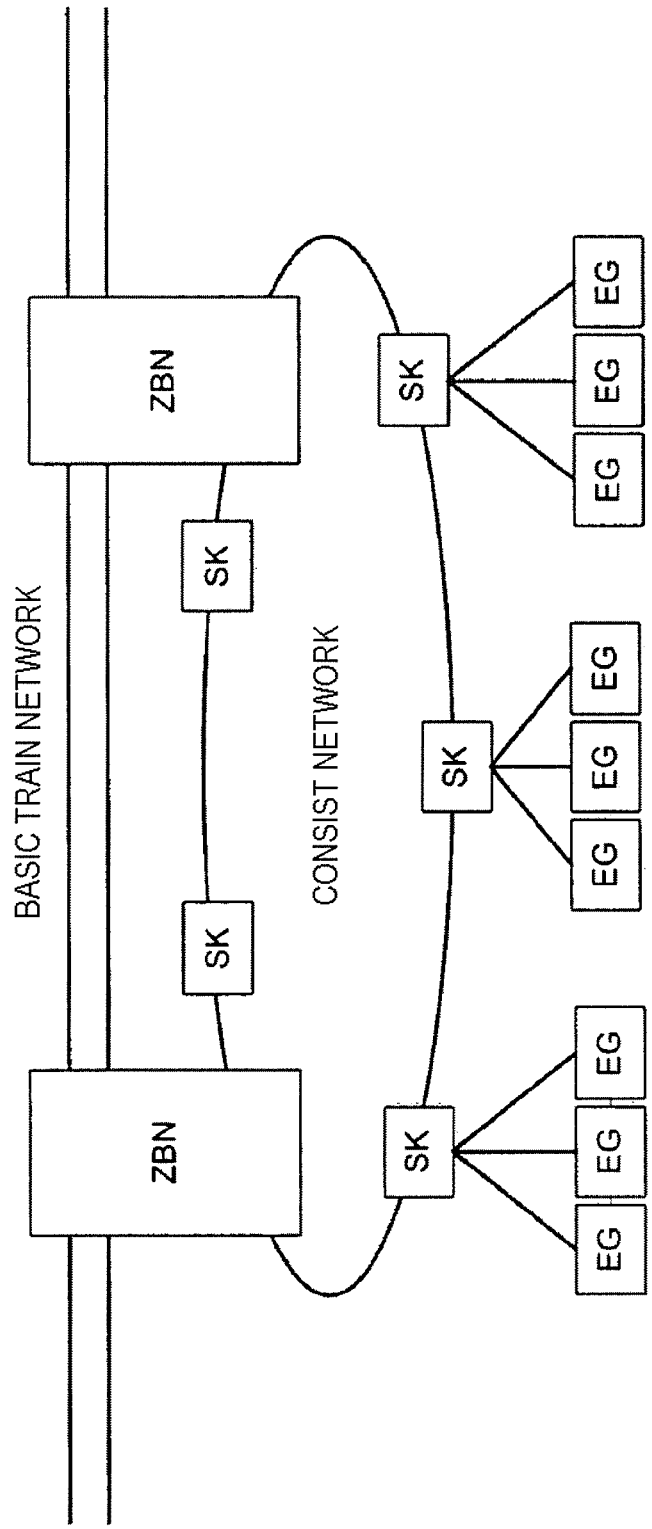
FIG. 2 shows a simplified representation of an application of Ethernet in a vehicle interconnection according to FIG. 1.

FIG. 2 shows a simplified representation of a fundamental Ethernet-based example topology for use in rail vehicles, e.g. in trains. Here, a basic train network ZBN generally runs through the rail vehicle interconnection. A ring line is coupled to the basic train network ZBN and contains a number of active components SK. A number of terminal devices, e.g. components, brakes, doors, an air conditioning system, WC facilities, overhead line pantographs and the like are in turn connected to the individual active components SK, for example in a star topology.

If an Ethernet-based network in, for example, a railway train, i.e. an interconnection or consist comprising a plurality of rail vehicles coupled to one another, is intended to replace current bus systems or network technologies, it can be assumed that each carriage of a rail vehicle network is set up in such a way that it can be coupled in at any given position in the network (i.e. there is no need to be concerned already about the position in the network where a carriage can or must be coupled in due to limited cable lengths, so that an overall controllable system is produced). At least one active switch component and at least one communication participant, which supply and control the respective (sub-) installations and systems, for example braking systems, air conditioning systems, communication and display or entertainment systems and the like of the corresponding carriage, are therefore located in each case, for example, in each— then "autonomous"—carriage of an interconnection. In other words, it is thus guaranteed that the maximum cable length of 100 m in an Ethernet-based network is not exceeded in any given combination of individual carriages of a rail vehicle interconnection. It is noted that carriages without communication participants may also be present. In this case, the active component can operate as a repeater.

However, operational situations may occur in the operation of a rail vehicle interconnection in which the power supply of the individual carriages cannot be guaranteed for at least a short time. Operational situations of this type are, for example, occurring interruptions or contact faults in supply lines routed between two carriages via plug-in connectors or couplings, or faults in the power collection from overhead lines. In such cases, the overall power supply, including the active components of a carriage and therefore also the control of these systems, for example the operating brake, may be defective for at least a short time, or may even fail persistently for a longer period.

Particularly in networks for sensitive installations and systems with safety-critical functions, such as, for example, brakes and doors in rail vehicles, this is intolerable, and a high availability is therefore required.

One approach for supplying at least the devices and equipment participating in the Ethernet with energy or power at low cost is a technique known as Power over Ethernet (PoE), in which the (signal) lines of the Ethernet also carry and supply an operating voltage for connected Ethernet devices at low cost. Ethernet terminal devices are normally supplied by an active component with a one-way feed direction (i.e. from the active component to the terminal device). Power over Ethernet per se has been introduced into common parlance, is standardized and also familiar, so that it will not be further discussed here.

Due to the one-way nature of Power over Ethernet, as mentioned above from an active component to a terminal device without any other dedicated or local supply connection, and the customary advantage of dispensing with a separate power supply on the terminal device itself when Power over Ethernet is used, Power over Ethernet on its own does not yet represent a suitable measure for guaranteeing a failsafe supply of the active components or their switching functions.

Figure 3:
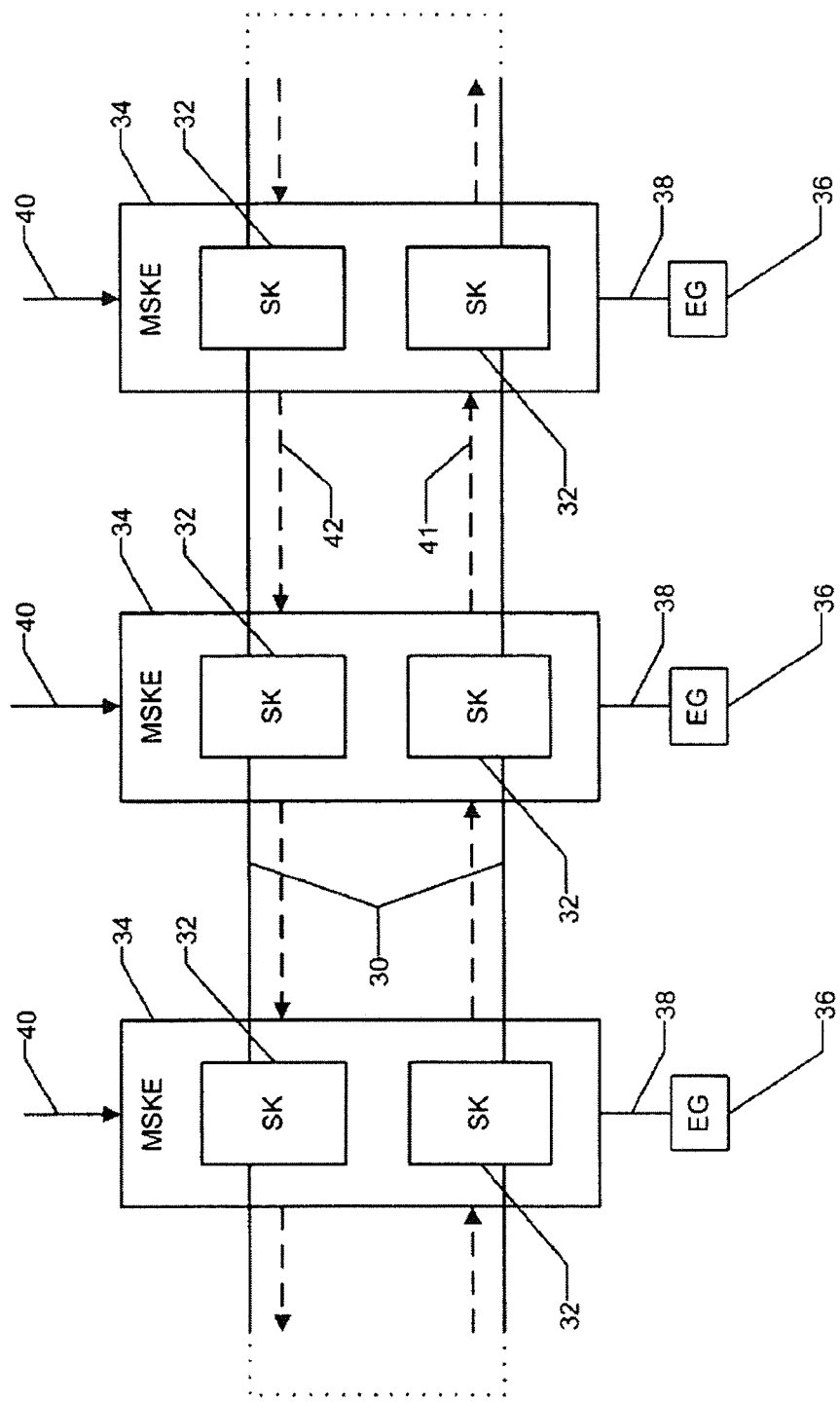
FIG. 3 shows a simplified schematic diagram of an arrangement and power supply of a switching function unit in an Ethernet topology according to at least one disclosed embodiment.

FIG. 3 shows a simplified schematic diagram of an arrangement and power supply of a switching function unit in an Ethernet topology according to at least one disclosed embodiment. The Ethernet topology can be designed, for example, as a line or ring topology for this purpose.

FIG. 3 shows a cutout of an Ethernet cabling 30 running through a vehicle interconnection, for example a rail vehicle interconnection or train or consist. In this disclosed embodiment, the Ethernet cabling 30 forms part of the Ethernet topology running through the rail vehicle interconnection. Two cable harnesses of the Ethernet run in each case through a carriage of the vehicle interconnection. Not only a ring line, but also any other arrangement of at least two cable harnesses of a network topology running parallel at least in sections are essentially conceivable.

Active components (SK) 32, for example switching or switch components, i.e. components with a switching function, are arranged along and in the Ethernet cabling 30 at predefined intervals of less than 100 m (the maximum Ethernet cable length without active components).

According to the disclosed embodiment of a switching function unit, a plurality, in the present disclosed embodiment two, of the active components 32 are combined into a (multiple) switching function unit (MSKE) 34.

The switching function unit 34 can accommodate the active components 32 combined in it in a single housing. Alternatively, a distributed arrangement among a plurality of receptacles, for example in housings, modules or other assemblies at different installation locations or with different cable lengths is also possible. This is partly determined by the power supply type, which is discussed in detail below.

The type of the combinable active components 32 is not further restricted, provided that fundamental Ethernet compatibility is maintained. For example, active components 32 with different numbers of connections or ports for connectable terminal devices and different construction sizes and forms are possible. The number of combinable components 32 is also not restricted to two.

On the whole, the proposed solution is not subject to any fundamental restriction, provided that all internal or active components 32 of a switching function unit 34 can be supplied from two different directions by means of Power over Ethernet and additionally by means of the local dedicated power supply, and the switching function 34 has at least four Ethernet ports, at least two of which can supply Power over Ethernet and at least two of which can be supplied by means of Power over Ethernet.

The active components 32 can additionally also have different parameters relating to their power supply, provided that suitable conversion and/or adaptation devices for conversion or adaptation as required of power, current and/or voltage are provided in the switching function unit 34 for the individual active components 32.

As shown schematically in FIG. 3, at least one Ethernet terminal device (EG) 36 can be connected in each case via a connection cable 38, for example in a star topology (other topologies are possible) to the individual switching function units 34. It can be provided for this purpose that individual connections or ports of the active components 32 of a switching function unit 34 can be routed to a housing section of the switching function unit 34 and can be connected there to the at least one terminal device 36, or that respective connection cables 38 are routed through a housing wall of the switching function unit 34 and can be connected internally in the latter to a connection of the active components 32. No restrictions apply to the connection of the terminal devices 36 to the active components 32 or the switching function units 34, so that the schematic representation of a terminal device 36 on a switching function unit 34 in FIG. 2 is intended to suffice representatively.

Each switching function unit 34 has at least three mutually independent energy or power supplies (voltage and/or current) 40 to 42.

The power supply 40 is a local supply or dedicated power supply directly on the switching function unit 34. The power supply 40 supplies operating power for the entire switching function unit 34, and therefore also operating power for all of the active components 32 combined in it, for example from an on-board power supply fed via overhead lines and/or a generator, and can be additionally protected by means of an emergency supply, for example a buffer battery or capacitor arrangement for short-time on-board power supply failure bridging. The power supply 40 supplies the switching function unit 34 in fault-free normal operation and, unlike Power over Ethernet, is limited only by the performance of the underlying on-board power supply.

The power supplies 41, 42 are Power over Ethernet supplies, which supply operating power one-way (indicated by arrows) for other devices via the (signal) lines of the Ethernet within the Ethernet cabling.

According to the disclosed embodiment, as shown in FIG. 3, each switching function unit 34 can receive power by means of Power over Ethernet from at least one neighboring switching function unit 34 which is, for example, adjacent in the course of the Ethernet, and/or can supply power by means of Power over Ethernet power to at least one other neighboring switching function unit 34 which is, for example, adjacent in the course of the Ethernet. Since each switching function unit 34 has its own local power supply 40 from which the power is also drawn for the Power over Ethernet supplies 41, 42, each switching function unit 34 forms an additional power supply (not local, because effected remotely via the Ethernet cabling) for its respective bilaterally neighboring switching function unit 34. Although Power over Ethernet per se provides one-way supply, a mutual, two-way supply facility of a switching function unit 34 from a first direction and a second direction arises through the facility of the power feed via Power over Ethernet from neighboring switching function units 34.

If, for example, a direction of circulation is given to the Ethernet line (which, indicated by the dotted connection line in FIG. 2, may be a ring line), the switching function unit 34 arranged in the center of FIG. 2 can be supplied not only by its local power supply 40, but also from a first direction (for example from the right via a first, upper Ethernet line section, i.e. from the switching function unit 34 on the right side in FIG. 2) and from a second direction (for example from the left via a second, lower Ethernet line section, i.e. from the switching function unit 34 on the left side in FIG. 3). This circuit arrangement is provided according to the disclosed embodiment for each switching function unit 34, so that the proposed power supply principle is continued over the entire Ethernet (ring) line and, in the example of a rail vehicle interconnection or train, over the entire rail vehicle interconnection.

Figure 4:
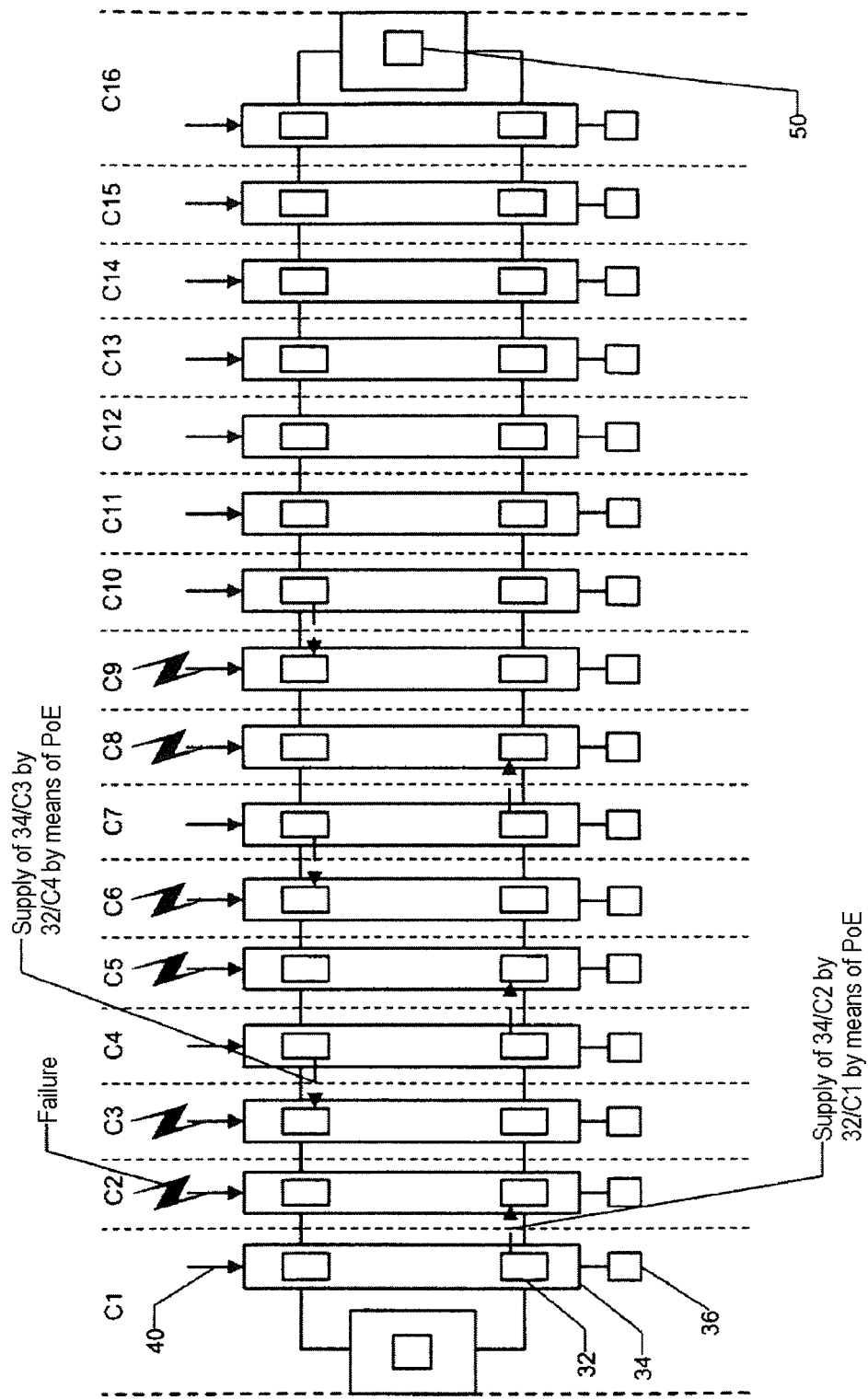
FIG. 4 shows a simplified representation to explain a fault behavior in a vehicle interconnection with an Ethernet topology and switching function units arranged therein according to the disclosed embodiment.

FIG. 4 shows a simplified representation to explain a fault behavior in a rail vehicle interconnection with an Ethernet ring topology and switching function units 34 arranged therein according to the disclosed embodiment.

In FIG. 4, the rail vehicle interconnection or consist comprises, for example, 16 carriages C1 to C16. Each of the carriages C1 to C16 contains at least one switching function unit 34 as shown in FIG. 3. Elements and reference numbers already described in relation to FIG. 3 are not repeated in FIG. 4 in the interests of greater clarity.

The carriages C1 and C16 may be drive vehicles, for example a railcar, a locomotive or generally a traction engine, controllable by a vehicle driver or by means of a remote control which, in addition to the at least one switching function unit 34, in each case have at least one suitably designed main or network control device 50. The network control device 50, which is designed according to requirements, is provided to control and coordinate in a predetermined manner the Ethernet of the rail vehicle interconnection and the components located therein and connected to it. The part of the Ethernet of the rail vehicle interconnection considered here represents a ring line or ring topology which has redundancy characteristics and may be designed as a single ring structure and/or at least partially a double ring structure.

In this disclosed embodiment, the carriages C2 to C15 are coupled carriages in each case with, as mentioned above, at least one (multiple) switching function unit 34, which in turn contains at least two active components 32 with Power over Ethernet capability, i.e. the capability to supply power to terminal devices 36 connected to the active component 32 via (signal) lines of the Ethernet. The carriages C2 to C15 may be driveless or driven carriages.

Each active component 32 is connected on one of the input connections or input ports to an Ethernet line coming from a first neighboring active component 32 and on one of the output connections or output ports to an Ethernet line leading to a second neighboring active component 32. Furthermore, each active component 32 has a number of further output connections to which a corresponding number of terminal devices 36 can be connected and/or, where appropriate, can be supplied with power by the active component 32 via Power over Ethernet. Connection facilities from and to further active components 32 (also referred to in common parlance as the uplink) can similarly be provided.

Each switching function unit 34 furthermore has the three mutually independent power supplies described with reference to FIG. 3 which are simultaneously available to all active components 32 within a switching function unit 34.

A number of possible fault events for the rail vehicle interconnection considered as an example are explained below on the basis of FIG. 4.

A first fault event may occur, for example, if the local power supply 40 (indicated by a (lightning-shaped) interruption symbol on the respective local power supply 40) is interrupted in the carriages C2 and C3. As mentioned above, an interruption of this type may occur at any time, for example due to a cable break or contact faults in the on-board power supply between individual carriages or due to a lacking power collection from overhead lines of an individual carriage.

In this case, the two carriages C2 and C3 of the rail vehicle interconnection are at least temporarily powerless without further measures. The active components 32 of these carriages C2 and C3 and all terminal devices 36 connected thereto therefore also fail, regardless of whether they are similarly supplied by a dedicated power supply on the terminal device or via Power over Ethernet by the active components 32 of these carriages C2 and C3. Furthermore, in the first fault event, the communication via the Ethernet of the rail vehicle is interrupted, since data packets, frames or tokens, irrespective of their direction of circulation in the network topology, can no longer reach the part of the network located in each case on the other side of the carriages C2 and C3. In this case, the Ethernet is also no longer available.

According to the disclosed embodiment, a fault event of this type is avoided in that, in the event of a failure of the local power supplies 40 of the carriages C2 and C3, the power supply of the switching function unit 34 of the carriage C2, and therefore also the power supply of the active components 32 contained therein and, where appropriate, the terminal devices 36 connected thereto, is taken over from outside the carriage C2, i.e. by the carriage C1, by Power over Ethernet via the signal lines of the Ethernet (indicated by the arrow pointing from the carriage C1 to the carriage C2 in FIG. 4), and the power supply of the switching function unit 34 of the carriage C3, and therefore also the power supply of the active components 32 contained therein and, where appropriate, the terminal devices 36 connected thereto, is taken over from outside the carriage C3, i.e. by the carriage C4 through Power over Ethernet via the signal lines of the Ethernet (indicated by the arrow pointing from the carriage C4 to the carriage C3 in FIG. 4).

According to the disclosed embodiment, the interruption of the local power supply 40 of the switching function units 34 of two carriages C2, C3 can thus be resolved by a mutual, two-way substitute power supply of these switching function units 34 from neighboring carriages C1, C4 of the rail vehicle interconnection via Power over Ethernet (41, 42 in FIG. 3).

This substitute power supply via the signal lines of the Ethernet can be continuously provided or alternatively can be applied or injected sufficiently quickly, automatically or independently only in an actual fault event by means of, for example, a suitable dedicated supply monitoring device (not shown) and Power over Ethernet injection device.

Since, in the first fault event, at least the components of both carriages C2, C3 necessary for the overall Ethernet of the rail vehicle interconnection can thus be maintained operationally capable, the control of the components and devices connected to the Ethernet also continues to be possible, and the terminal devices 36, for example components, brakes, doors, an air conditioning system, WC facilities, overhead line pantographs and the like, connected to the individual active components 32 are kept suppliable, response-capable and controllable.

In keeping with the above, the functional capability of the Ethernet can be guaranteed in a second fault event in which the local power supply 40 of further carriages of the rail vehicle interconnection, for example not only the local power supply 40 of the carriages C2 and C3, but also the local power supply 40 of the carriages C5 and C6, is interrupted.

In one modification, it can also be provided that, initially temporarily and transitionlessly, an emergency energy storage device provided, for example, in each or some of the carriages C1 to C16, such as, for example, a suitably dimensioned buffer battery or a suitably dimensioned capacitor arrangement, for example in or on the switching function units 34, takes over this substitute power supply transitionlessly, and the substitute power supply is injected by means of Power over Ethernet from the neighboring carriages only when the fault event persists for a predetermined time and/or the energy reserve of the emergency energy battery device runs short.

In other words, according to the disclosed embodiment, an arrangement, a device and/or a component is implemented, in which at least four Ethernet ports are provided, wherein at least two ports thereof can feed Power over Ethernet and at least two ports can receive Power over Ethernet, and which unites or operationally and functionally combines a plurality of active components 32 with a switching function in a device. In relation to the network function, the active components 32 in this arrangement, this device or this component are mutually independent. The arrangement, the device or the component as a switching function unit 34 is supplied by three mutually independent power sources 40, 41 and 42 which are locally and spatially separated (are located, for example in three different carriages, i.e. their own carriage and two other carriages, and not necessarily in immediately neighboring carriages, but within the maximum possible Ethernet segment length). The power supply 41, 42 from outside their own carriage is implemented via the Ethernet signal line. A considerable reduction in the cabling outlay and a considerable cost reduction are thereby advantageously achieved. Since active components 32 in each case supply other active components 32 by means of Power over Ethernet, a mutual, two-way supply by Power over Ethernet is implemented. Since two active components 32 are jointly supplied by an external power supply via a signal line, the availability of the components and the communication on the Ethernet is advantageously increased.

It is thus advantageously achieved according to the disclosed embodiment that a twofold fault affecting two neighboring switching function units 34 (e.g. in C2, C3; C5, C6; C8, C9) does not yet cause any communication restriction on the Ethernet. Furthermore, multiple twofold faults do not yet cause any communication restriction either, provided that at least one absence of fault (C4) exists between two twofold faults (e.g. C2, C3 and C5, C6).

The disclosed embodiments have been described on the basis of a rail vehicle interconnection. However, it is not restricted to a rail vehicle interconnection, in particular not to one in which a switching function unit combines precisely two active components into one unit, but is immediately obviously applicable to any given Ethernet line structure, with the overall resulting advantages in terms of network features that a long spatial extension with simultaneously high bandwidth and high availability is achieved, an implementation which is economical compared with known topologies is enabled, a reduced cabling outlay is necessary due to the redundant power supply via signal lines, and an overall minimal number of network components is required.

Modifications which are similar to the description of the disclosed embodiments detailed above are immediately obvious to the person skilled in the art and are not, therefore, to be regarded as a deviation from the subject matter of the invention and a departure from its scope of protection, which is determined by the patent claims alone.

The invention claimed is:

1. An arrangement for a switching function unit for Ethernet, the arrangement comprising:
a plurality of active components of the Ethernet which are combined by the switching function unit to form a functional unit; and
at least three mutually independent power supplies for independently providing an operating power to the active components,
wherein a first of the at least three power supplies is a local power supply of the switching function unit having power drawn directly from overhead lines or a generator, a second of the at least three power supplies is a first external power supply via Ethernet of the switching function unit, and a third of the at least three power supplies is a second external power supply via Ethernet of the switching function unit, and wherein the Ethernet has a ring topology.

2. The arrangement for a switching function unit of claim 1, wherein the switching function unit has at least four Ethernet connection ports, at least two of which supplying Power over Ethernet as the external power to outside the switching function unit, and at least two of which receiving Power over Ethernet as the external power from outside the switching function unit.

3. The arrangement for a switching function unit of claim 1, wherein the switching function unit is supplied with power in a normal operation of the local power supply and, in response to a fault in the local power supply, is supplied with Power over Ethernet by at least one of the first and the second external power supplies.

4. The arrangement for a switching function unit of claim 1, wherein:
the switching function unit is supplied via a first Ethernet line by a first active component of a first neighboring switching function unit;
the switching function unit is supplied with Power over Ethernet via a second Ethernet line by a second active component of a second neighboring switching function unit; and
the power supply is provided by the first and second active components of the neighboring first and second switching function units for all active components of the switching function unit.

5. The arrangement for a switching function unit of claim 1, wherein the first and second external power supplies thus form, via Ethernet on the switching function unit, a mutual, two-way power supply of the switching function unit by Power over Ethernet via signal lines of the Ethernet.

6. The arrangement for a switching function unit of claim 1, wherein at least some of the number of active components of the switching function unit are accommodated in a common housing of the switching function unit.

7. The arrangement for a switching function unit of claim 1, wherein at least some of the plurality of active components of the switching function unit are arranged in a distributed manner in an environment of the switching function unit and are united by at least common power supply lines to the switching function unit.

8. The arrangement for a switching function unit of claim 1, wherein at least one Ethernet terminal device is supplied with Power over Ethernet by the active components of the switching function unit, wherein the active components draw Power over Ethernet from the local power supply for the at least one terminal device in a normal operation and, in in response to a fault in the local power supply, draw Power over Ethernet via Ethernet from at least one of the first and second external power supplies for the at least one terminal device.

9. The arrangement for a switching function unit of claim 1, wherein:
each of the active components of the switching function unit has a power supply for Power over Ethernet independent from a respective other active component, the power supplies forming a mutual and two-way external power supply of the switching function unit outwards for neighboring switching function units; and in response to a fault in the local power supply of at least one neighboring switching function unit, the switching function unit supplies the at least one neighboring switching function unit by Power over Ethernet.

10. The arrangement for a switching function unit of claim 1, wherein the active components are active Ethernet switch components with a switching function.

11. The arrangement for a switching function unit of claim 1, wherein at least one Ethernet terminal device is connected in a star topology to at least one of the active components which is an active switch and/or is supplied via at least one of the active components through Power over Ethernet.

12. A real-time Ethernet, comprising a multiplicity of arrangements for a switching function unit as claimed in claim 1, wherein the switching function units are arranged successively in the Ethernet such that a fault event in the local power supplies of at least two switching function units neighboring one another is bridged by Power over Ethernet from switching function units neighboring the latter, the local power supplies of which operate fault-free, and wherein the multiplicity of arrangements are each powered by a respective local power supply only when no fault is detected, wherein, when a first of the at least two switching function units neighboring one another has a fault in the local power supply a second of the at least two switching function units is configured to supply operating power to the first switching function unit and to the second switching function unit from the local power supply of the second switching function unit and independent of other power supplies.

13. A real-time Ethernet, comprising a multiplicity of arrangements for a switching function unit as claimed in claim 1, wherein each switching function units are each configured to be an external power recipient and an external power provider, providing power from the local power supply of each switching function unit to at least one neighboring switching function unit.

14. The arrangement for a switching function unit of claim 1, wherein the ring comprises a plurality of arrangements interconnected by Ethernet so that the ring is powered exclusively by local power supplies.

\* \* \* \* \*